July 7, 1964 B. M. WILTGEN ETAL 3,139,898
PLASTIC PRESSURE REGULATOR
Filed May 12, 1961 2 Sheets-Sheet 2
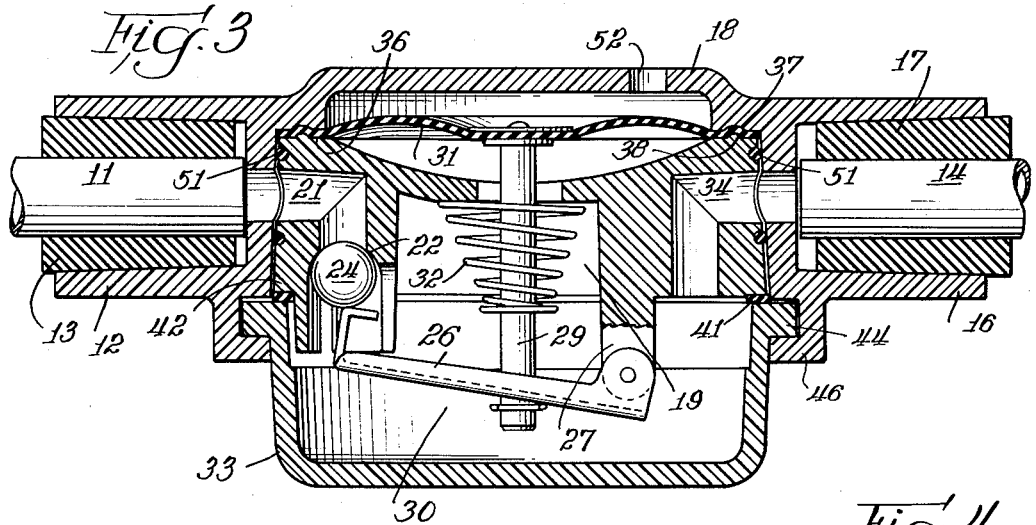
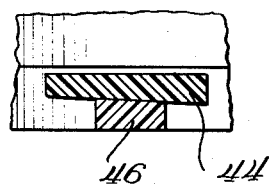
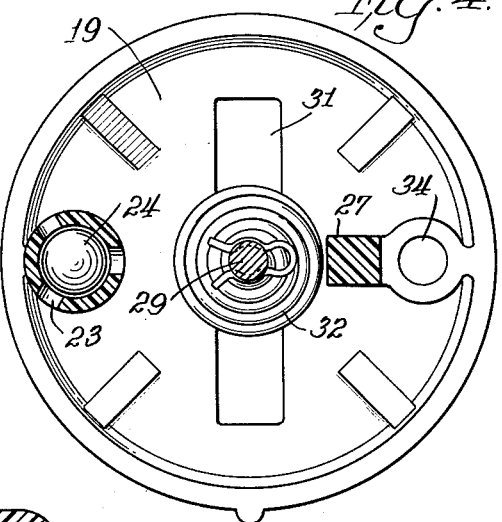
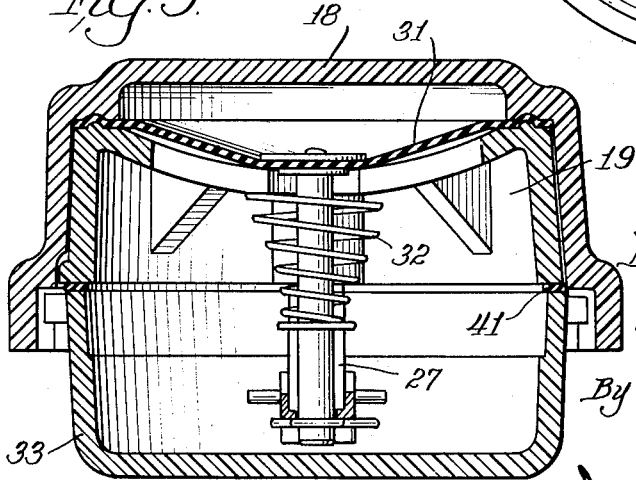
Inventors
Bernard M. Wiltgen
Robert J. White
and Tully Trainor
By
Jones, Dark & Roberson, att'ys United States Patent Office 3,139,898
Patented July 7, 1964

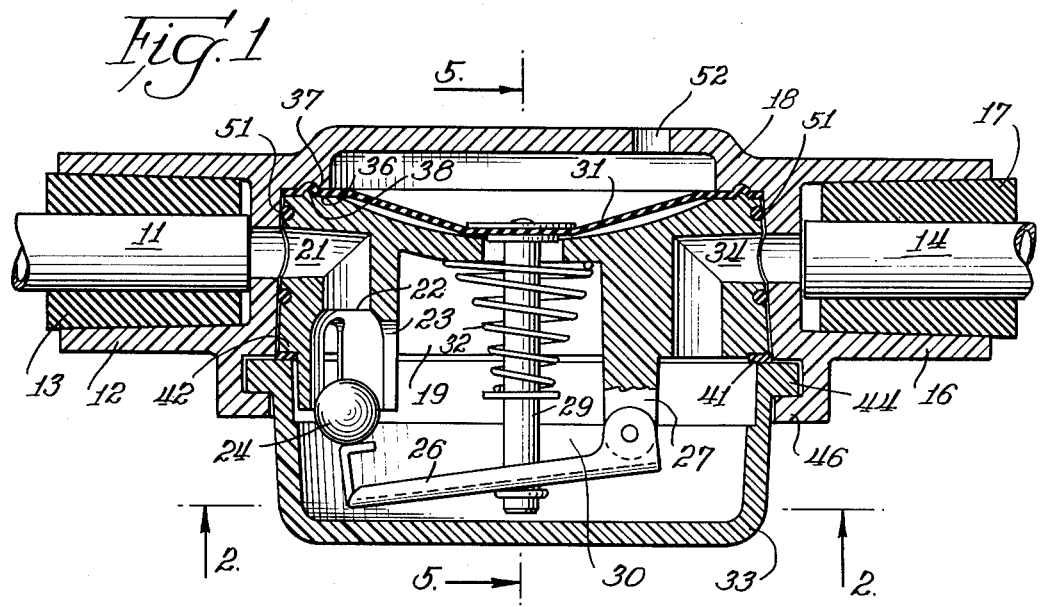
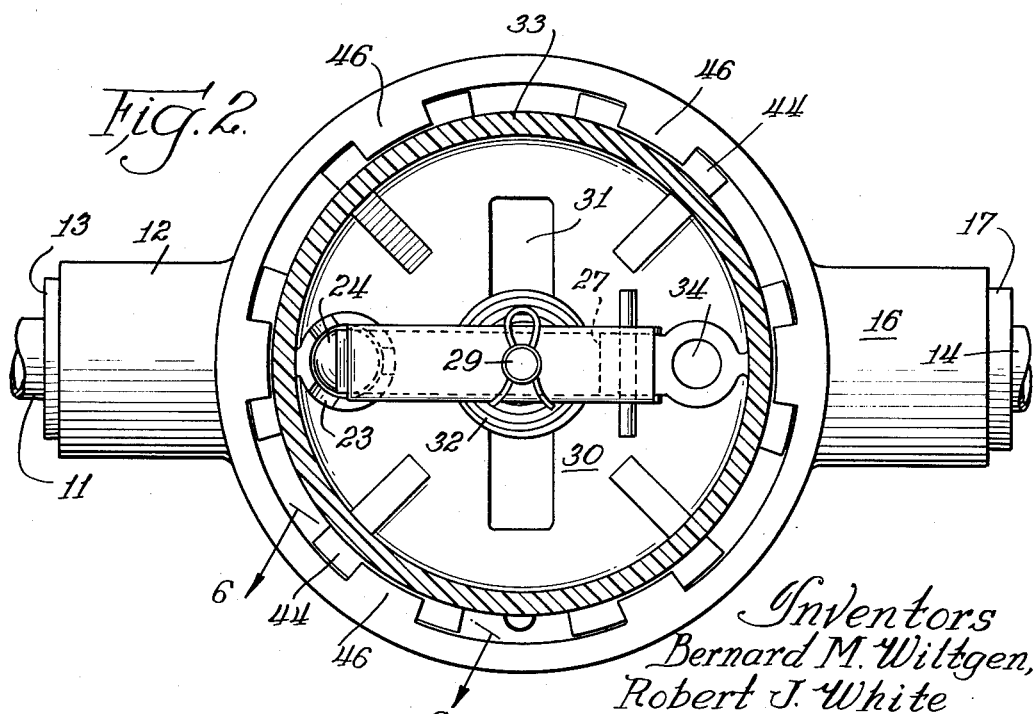

3,139,898
PLASTIC PRESSURE REGULATOR
Bernard M. Wiltgen, Robert J. White, and Tully Trainor, Chicago, Ill., assignors to Milesmaster Incorporated of America, Chicago, Ill., a corporation of Illinois
Filed May 12, 1961, Ser. No. 109,574
4 Claims. (Cl. 137—454.6)

In fuel line attachments for automobiles an important consideration is, of course, the economy of manufacture. In accessories sold to automobile owners, another important consideration is ease of installation. In the case of accessories which must be inserted into the fuel line ease of installation has proved to be elusive.

It has seemed that it ought to be easy to undo the fuel line where it was attached to any element such as the carburetor, apply the accessory to the carburetor in its place and apply the fuel line to the accessory. The wide variety of different fittings and space limitations, as well as the need to do considerable bending of the fuel line to make it fit properly at a different place, has caused twofold annoyance. There was annoyance to accessory manufacturers in having to supply a variety of fittings and a variety of instructions for different cars, and to receive complaints when a customer needed, or thought he needed, something not supplied. There was annoyance to customers in the difficulty of figuring out how to do the job, which of the fittings supplied to use, sometimes stripping threads on the fittings, and in general running into unexpected difficulties.

At least one manufacturer has resorted to making provisions for cutting a section out of the fuel line and attaching the accessory to the two "raw" ends thus provided by means of two lengths of rubberlike hose with spring clips. The accessory itself in one such instance has been made of a plastic body with projecting tubelike fittings of the same diameter as the common fuel lines. A length of hose would have one of its ends slipped over one of the plastic fittings and over the raw end of the fuel line and a spring clip applied around each. On the whole, this has been an improvement, but it has not been a satisfactory solution. The length of the device plus two lengths of hose has required a considerable overall length of space to be available. The spring clips are hard to handle without a special tool. Sometimes a clip would slip from pliers when being held stretched open and if the slippage happened to occur near the plastic body, it could cause cracking of the body, with a resulting leak which would spoil the accessory.

According to the present invention, the problem has been solved. The inventors do not claim to have invented a new type of connection, but rather to have searched far and wide and to have chosen and proved to be satisfactory one which was not obviously suitable for this purpose. In the course of adapting it for this purpose, they have also provided a new type of plastic accessory body. There are also novel internal features of the accessory, which are largely dependent upon the provision of a plastic main body, which lends itself to the new style of attachment.

From the attachment standpoint, the novelty of the new main body of the accessory is that it is provided with inlet and outlet collars of a sufficiently large diameter, slightly tapered, so that into each may be thrust the raw end of a fuel line surrounded by a rubberlike bushing. These collars and hence the plastic body are made of a high tensile strength and high impact strength plastic such as nylon so as not to be cracked either by the wedging action as the fuel line ends are thrust into the tapered collar or by such swelling of the bushing as may, and preferably does, subsequently occur, or by being accidentally struck.

Anyone who has not yet seen this new style of accessory in use probably has the reaction that surely this method of attachment is not safe for fuel line use on automotive vehicles; that surely the vibration of the engine combined with the jolts from the road will sooner or later cause some of the fuel lines to slip out and spray gasoline around the hot engine. That is not the case is apparently the result of a careful choice of taper and a careful choice of bushing. The taper is so slight that the outward component of the wedging action is negligible compared to the friction which it creates. The rubberlike bushing is of a material which is affected by contact with the gas line to swell a slight amount without getting soft or flabby. The slight swelling binds the bushing in place, both to the collar and to the fuel line, even more tightly than was achieved by the initial wedging thrust.

As to the internal construction of the plastic accessory, a very economical and yet safe arrangement has been provided. The particular device in question in this instance is a diaphragm type of pressure regulator. The main body is provided with a cavity circular in cross section, and an inner body fits neatly into this circular cavity. The periphery of the leading face of the inner body squeezes the periphery of a diaphragm against the main body, both gripping and sealing it. The inner body carries the necessary valving parts including a stem carried by the diaphragm and operating a valving lever. A bowl seals the lower end of the inner body and thereby seals off the valving the chamber formed by the inner body, at the same time applying the necessary pressure of the inner body on the diaphragm. There remains however, the problem of preventing the higher fuel pressure from the inlet fitting from seeping around the inner body to bypass the valve, and preventing fuel from escaping between the inner and outer bodies. This is accomplished by providing a small O-ring seal which neatly surrounds the inlet passage in the interface between the main body and the inner body, and another around the outlet passage.

Additional objects and advantages of the invention will be apparent from the following description and from the drawings.

*Designation of Figures*

FIGURE 1 is a longitudinal sectional view through the device in a plane which may be called the vertical plane.

FIGURE 2 is a horizontal sectional view through the bowl of the device looking upwardly at the main body.

FIGURE 3 is a view similar to FIG. 1 but showing the valve in the closed position to which it is moved by the diaphragm when the predetermined pressure exists in the valving chamber.

FIGURE 4 is a horizontal sectional view of the inner body assembly, taken approximately just above the valve lever, and looking upwardly.

FIGURE 5 is a transverse vertical sectional view taken approximately along the line 5—5 of FIG. 1.

FIGURE 6 is a fragmentary sectional view taken approximately along the line 6—6 of FIG. 2 to show the wedging construction which is effectuated by twisting the bowl.

*General Description*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As seen in FIG. 1, the inlet is at the left, the end 11 of a fuel line leading from the fuel pump being firmly secured in inlet socket 12 by means of a rubberlike bushing or plug 13. Similarly at the right, an end 14 of fuel line leading to the carburetor is firmly secured in outlet socket 16 by a rubberlike bushing or plug 17. Sockets 12 and 16 are integrally molded with the main body 18 of a high tensile strength and high impact strength plastic such as nylon (now preferred), polypropylene, high impact polystyrene, for example.

An inner body 19 is molded to form an inlet passage 21 having a valve seat 22 leading to a ball cage 23 in which a ball 24 is supported by a lever 26. The lever 26 is pivoted to a bracket 27. It may be actuated from the open position shown in FIG. 1 to the closed position shown in FIG. 3 by a connecting rod or stem 29 carried by a diaphragm 31, to which it is sealed and mounted in conventional manner. A spring 32 urges connecting rod 29 downwardly, allowing lever 26 and ball 24 to drop. Gasoline or other liquid fuel can now enter through inlet passage 21 and seat 22 and through slots in cage 23 to the main or valving chamber 30 formed on the under side of inner body 19 and closed off by bowl 33. The gasoline may flow through outlet passage 34 to fuel line 14.

The purpose of the pressure regulator is to hold the outlet pressure at a given value, even though the pressure in supply fuel line 11 may be higher or pulsating. When this value is reached within the main chamber 30, it exerts sufficient force on the underside of diaphragm 31 to raise the stem 29 against the pressure of spring 32 to close the ball valve 24 upon the seat 22, as seen in FIG. 3. This stops the inflow of gasoline, so that the pressure does not go higher. However, the desired value of pressure on the gasoline is maintained by spring 32 which urges the stem 29 and diaphragm 31 downwardly to expel the gasoline.

*Sealing of Main Chamber*

The main chamber 30 is sealed at the top by diaphragm 31 and at the bottom by bowl 33. The sealing pressure is applied to both by the same means.

Upward thrust of the inner body 19 squeezes the periphery of the diaphragm 31 between the peripheral portion 36 of the leading face of the inner body 19 and an annular shoulder portion 37 on the inside of the main body 18. Preferably there is a tiny annular rib 38 on the peripheral portion 36 and a matching groove on the shoulder 37 to doubly ensure both gripping and sealing of the diaphragm 31 at its periphery.

Of course this seal depends upon adequate pressure of the inner body 19 toward the shoulder 37. This is applied by bowl 33 which bears on a gasket 41, which in turn bears on the peripheral shoulder 42 of the inner body. The bowl 33 is provided with a series of outward flanges 44 which engage inward lugs 46 formed on the main body. The spacing between the flanges 44, and between lugs 46, is sufficient to permit passage of the flanges 44. The engaging faces of flanges 44 and lugs 46 are tapered as seen in FIG. 6 to provide a wedging action as the bowl 33 is twisted. This wedging action thrusts the bowl firmly against gasket 41 which thrusts inner body 19 firmly against the periphery of diaphragm 31. Thus the same sealing pressure seals bowl 33 to the periphery of inner body 19 and seals the inner body 19 against the diaphragm 31, thereby sealing the main chamber 30. It is important that gasket 41 have indefinite life and resiliency to maintain pressure on the diaphragm. Cork bearing compounds are therefore preferred.

*Sealing of Vertical Interface*

Although inner body 19 fits very snugly into the cavity formed within main body 18, it cannot seat against it because it is not practical to have it do so and at the same time be free to move inwardly for applying pressure against the periphery of the diaphragm 31. This presented a problem in that the interface between inner body 19 and main body 18 bisects the inlet passage 21 and the outlet passage 34. Gasoline could leak from one to the other, bypassing valve ball 24, and could also leak downwardly and escape between lugs 46. Both of these leakages are prevented by providing O-ring seals 51 in the interface, closely surrounding the passage 21 and 34. The O-ring seals should, of course, according to standard O-ring practice, be slightly squeezed between the two faces of the interface, and at their outer peripheries should bear against the wall of the groove by which they are received. They may then be loose at their inner peripheries. The light squeezing pressure mentioned is sufficient because the pressure of gasoline tends to deform them to increase the sealing pressure as the gasoline pressure is increased. Because the light pressure initially is enough, they do not impede the insertion of the inner body 19 into the outer body 18.

The space above the diaphragm need not be sealed and in fact is preferably vented to the atmosphere through a small opening 52.

*Materials Used*

Although experts on the various seals could choose suitable materials, the following information may be helpful.

Bushings or plugs 13 and 17 are desirably made of neoprene. A grade found suitable is compound 30-N-4 of Anchor Packing Company, 900 South Wabash Avenue, Chicago 5, Illinois.

For the O-rings 51, buna-N synthetic rubber is preferred. A grade having a durometer reading of 70 has been found satisfactory, with a wall thickness of $\frac{1}{16}$ inch.

For gasket 41 a mixture of buna-N and cork is preferred. A compound of this type found to be satisfactory is MC 757 of Cooper Manufacturing Company of Marshalltown, Iowa.

The plastic material was discussed earlier.

We claim:

1. A pressure regulator including an inverted cup-shaped shell having inlet and outlet fittings molded integrally therewith of synthetic plastic, an insert also of inverted cuplike shape snugly fitting within the shell and, with the fittings, forming inlet and outlet passages, a diaphragm peripherally secured between the insert and the shell, valving structure controlling flow between the inlet and outlet passages and operatively connected to the center of the diaphragm, said insert and shell being shaped to form a chamber providing for movement of the diaphragm, and a bowl peripherally sealed to the insert and means for pressing the bowl against the insert to press it into the shell to clamp the diaphragm periphery.

2. A pressure regulator including an inverted cup-shaped shell having inlet and outlet fittings molded integrally therewith of synthetic plastic, an insert also of inverted cuplike shape snugly fitting within the shell and, with the fittings, forming inlet and outlet passages, a diaphragm peripherally secured between the insert and the shell, valving structure controlling flow between the inlet and outlet passages and operatively connected to the center of the diaphragm, said insert and shell being shaped to form a chamber providing for movement of the diaphragm, and a bowl peripherally sealed to the insert and pressing it into the shell to clamp the diaphragm periphery, said bowl having spaced outwardly extending lugs on its periphery and said shell having inwardly extending lugs spaced for the passage therebetween of outwardly extending lugs including upwardly camming surface for twist-tightening to press the insert against the diaphragm.

3. A pressure regulator including an inverted cup-shaped shell molded of synthetic plastic, an insert also of inverted cuplike shape snugly fitting within the shell and forming inlet and outlet passages, a diaphragm peripherally secured between the insert and the shell, valving structure controlling flow between the inlet and outlet passages and operatively connected to the center of the diaphragm, said insert and shell being shaped to form a chamber providing for movement of the diaphragm, and a bowl peripherally sealed to the insert and means for pressing the bowl against the insert to press it into the shell to clamp the diaphragm periphery.

4. A pressure regulator including an inverted cup-shaped shell molded of synthetic plastic, an insert also of inverted cuplike shape snugly fitting within the shell and forming inlet and outlet passages, a diaphragm peripherally secured between the insert and the shell, valving structure controlling flow between the inlet and outlet passages and operatively connected to the center of the diaphragm, said insert and shell being shaped to form a chamber providing for movement of the diaphragm, and a bowl peripherally sealed to the insert and pressing it into the shell to clamp the diaphragm periphery, said bowl having spaced outwardly extending lugs on its periphery and said shell having inwardly extending lugs spaced for the passage therebetween of outwardly extending lugs including upwardly camming surface for twist-tightening to press the insert against the diaphragm.

References Cited in the file of this patent

UNITED STATES PATENTS

| | | |
|---|---|---|
| 1,793,292 | Taylor | Feb. 17, 1931 |
| 2,209,235 | Nathan | July 23, 1940 |
| 2,230,725 | Nathan | Feb. 4, 1941 |
| 2,572,786 | Vining | Oct. 23, 1951 |
| 2,826,214 | Volker | Mar. 11, 1958 |
| 2,868,223 | Lum | Jan. 13, 1959 |
| 2,911,187 | Owsley | Nov. 3, 1959 |
| 2,944,566 | Modrin | July 12, 1960 |
| 2,950,081 | Steinbuch | Aug. 23, 1960 |